United States Patent
Kanter et al.

(10) Patent No.: US 10,210,541 B2
(45) Date of Patent: Feb. 19, 2019

(54) CREDITING IMPRESSIONS TO ADVERTISEMENTS IN SCROLLABLE ADVERTISEMENT UNITS

(71) Applicant: Facebook, Inc., Menlo Park, CA (US)

(72) Inventors: Jeffrey Andrew Kanter, San Francisco, CA (US); David Mason, Seattle, WA (US); Yi Tang, Mountain View, CA (US); Brian Steadman, Seattle, WA (US); Chinmay Deepak Karande, Mountain View, CA (US); Qiao Lian, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 904 days.

(21) Appl. No.: 13/933,552

(22) Filed: Jul. 2, 2013

(65) Prior Publication Data

US 2015/0012352 A1   Jan. 8, 2015

(51) Int. Cl.
*G06Q 30/00*   (2012.01)
*G06Q 30/02*   (2012.01)

(52) U.S. Cl.
CPC ............... *G06Q 30/0246* (2013.01)

(58) Field of Classification Search
None
See application file for complete search history.

(56) References Cited

U.S. PATENT DOCUMENTS

| | | | |
|---|---|---|---|
| 2008/0228537 A1* | 9/2008 | Monfried | G06Q 30/0255 705/14.53 |
| 2009/0259537 A1 | 10/2009 | Veksler et al. | |
| 2010/0036733 A1 | 2/2010 | Chan et al. | |
| 2012/0166532 A1 | 6/2012 | Juan et al. | |
| 2012/0278742 A1 | 11/2012 | Takami | |
| 2012/0284112 A1* | 11/2012 | Pradeep | G06Q 30/0201 705/14.41 |
| 2013/0066706 A1 | 3/2013 | Wu et al. | |
| 2013/0085840 A1 | 4/2013 | Parreira | |

(Continued)

FOREIGN PATENT DOCUMENTS

| | | |
|---|---|---|
| JP | 2007-286832 A | 11/2007 |
| JP | 2009-268102 A | 11/2009 |
| JP | 2011-113280 A | 6/2011 |

(Continued)

OTHER PUBLICATIONS

Schwartz, Barry, Google Testing Scrolling AdSense Ads, Dec. 12, 2007, https://www.seroundtable.com/archives/015658.html.*

(Continued)

*Primary Examiner* — Michael W Schmucker
(74) *Attorney, Agent, or Firm* — Fenwick & West LLP

(57) ABSTRACT

An online system presents a scrollable advertisement unit including multiple advertisements to a user. The scrollable advertisement unit presents one or more advertisements in a display area, and allows a user to navigate through the advertisements in the scrollable advertisement unit to display different advertisements in the display area. One or more rules for crediting an impression to an advertisement in the display area are applied, and a tracking mechanism associated with the advertisement in the display area is loaded if at least one rule is specified. Loading the tracking mechanism identifies an impression of its associated advertisement.

18 Claims, 3 Drawing Sheets

(56) References Cited

U.S. PATENT DOCUMENTS

2013/0305170 A1* 11/2013 de Souza .............. G06F 3/0485
715/760

FOREIGN PATENT DOCUMENTS

| JP | 2012-160034 A | 8/2012 |
| JP | 2013-054718 A | 3/2013 |
| JP | 5185240 B2 | 4/2013 |
| WO | WO 2013/070491 A1 | 5/2013 |

OTHER PUBLICATIONS

Google's Scrolling Adsense Ads, https://www.youtube.com/watch?v=NVGO-qgBXkU, Jan. 8, 2008.*

PCT International Search Report and Written Opinion, PCT Application No. PCT/US2014/037102, dated Sep. 1, 2014, twelve pages.

Hua, M., et al., "Updating Features Based on User Actions in Online Systems," U.S. Appl. No. 13/690,254, filed Nov. 30, 2012.

Kabiljo, I., et al., "Customized Predictors for User Actions in an Online System," U.S. Appl. No. 13/689,969, filed Nov. 30, 2012.

Shalita, A. M., et al., "Dynamic Expressions for Representing Features in an Online System," U.S. Appl. No. 13/690,088, filed Nov. 30, 2012.

Bathelot, B., "What is Pixel tracking definition?," Mar. 22, 2013, one page. [Online] [Retrieved Feb. 8, 2017] Retrieved from the Internet <URL: http://digitalmarketing-glossary.com/What-is-Pixel-tracking-definition.>.

Canadian Intellectual Property Office, Office Action, Canadian Patent Application No. 2,912,754, dated Dec. 9, 2016, five pages.

Gross, P., "Cookies, Tags and Pixels: Tracking Customer Engagement," Visual IQ, Sep. 30, 2012, vol. 2, Issue 9, three pages. [Online] [Retrieved Feb. 9, 2017] Retrieved from the Internet http://www.visualiq.com/resources/marketing-attribution-newsletter-articles/cookies.>.

Japan Patent Office, Office Action, Patent Application No. 2016-523739, dated Apr. 3, 2018, six pages.

Canadian Intellectual Property Office, Office Action, Canadian Patent Application No. 2,912,754, dated Nov. 7, 2017, eight pages.

* cited by examiner

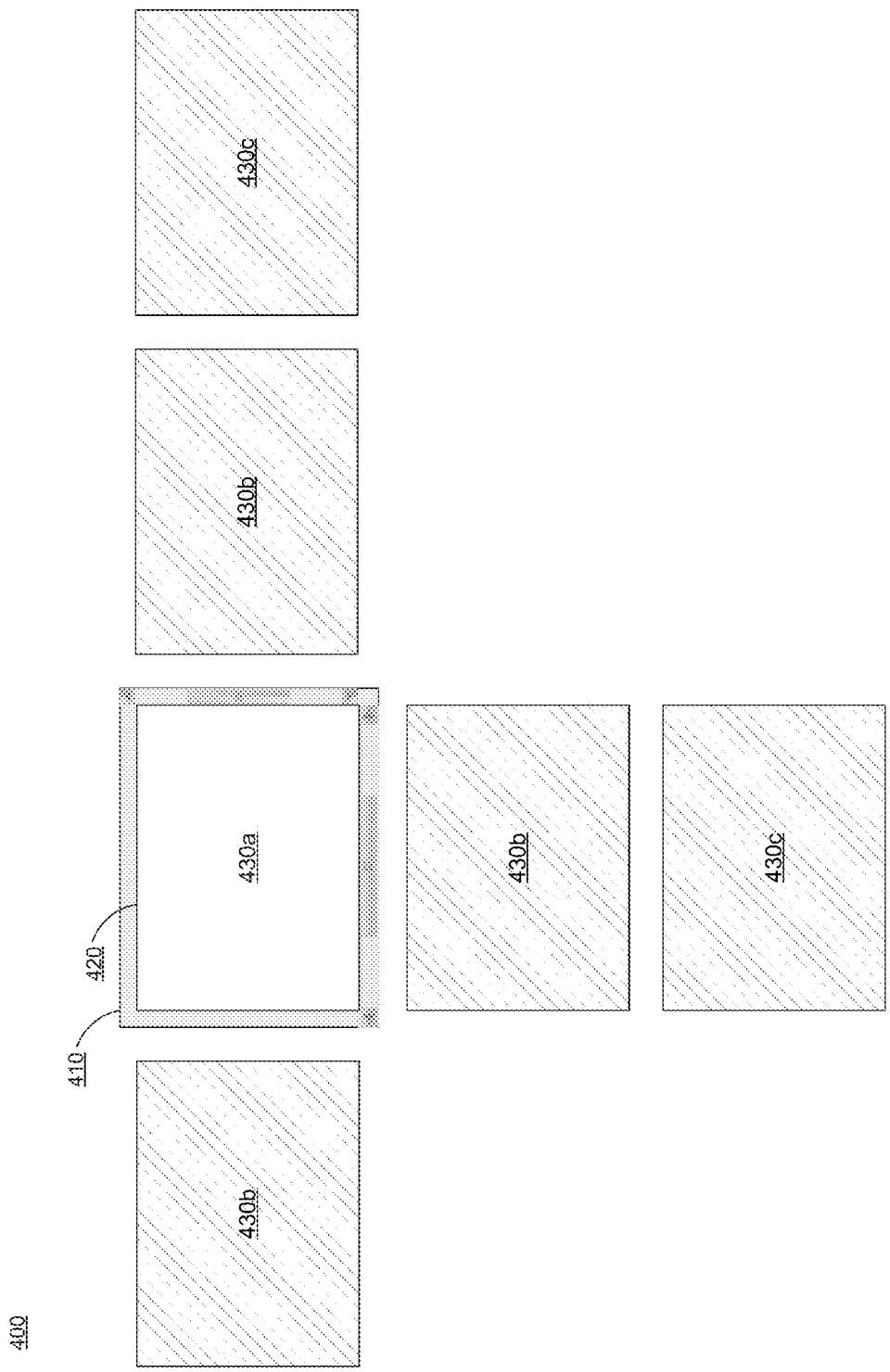

CREDITING IMPRESSIONS TO ADVERTISEMENTS IN SCROLLABLE ADVERTISEMENT UNITS

BACKGROUND

This invention relates generally to online systems, and in particular to crediting advertisement impressions on an online system.

Presenting advertisements to users of an online system allows an advertiser to gain public attention for products or services and to persuade online system users to take an action regarding the advertiser's products, services, opinions, or causes. Many online systems generate revenue by displaying advertisements to their users. Frequently, online systems charge advertisers for each presentation of an advertisement to an online system user (e.g., each "impression" of the advertisement).

Additionally, as users more frequently use mobile devices or other devices with limited display area, online systems may combine multiple advertisements into a scrollable advertisement unit. This reduces the display area on which advertisements are presented to reduce the likelihood of user alienation, while allowing users to navigate through the scrollable advertisement unit to view different advertisements. For example, a user may scroll horizontally or vertically through the scrollable advertisement unit to access different advertisements included in the scrollable advertisement unit.

Conventionally, online systems identify an impression of an advertisement if the advertisement is included in a scrollable advertisement, even if a user does not navigate through the scrollable advertisement unit to view the advertisement. For example, a user presented with a scrollable advertisement unit including advertisements does not interact with the scrollable advertisement unit, so only a single one of the advertisements in the scrollable advertisement unit is presented to the user; however, in conventional systems, an impression of each advertisement in the scrollable advertisement unit is credited. Thus, because scrollable advertisement units often present a fewer number of advertisements to a user than the number of advertisements included in the scrollable advertisement unit, conventional systems may identify impressions of advertisements included in a scrollable advertisement that are not displayed to a user. This method of identifying impressions may cause an advertiser to be charged for impressions of advertisements in a scrollable advertisement unit that were not actually displayed to a user.

SUMMARY

An online system derives revenue by displaying advertisements to its users. To reduce the likelihood of alienating users by presenting a large number of advertisements, the online system generates a scrollable advertisement unit including multiple advertisements. The scrollable advertisement unit includes a display area presenting one or more advertisements identified from multiple advertisements included in the scrollable advertisement unit. By interacting with the scrollable advertisement unit, an online system user causes different advertisements from the multiple advertisements included in the scrollable advertisement unit to be presented by the display area.

The online system may charge an advertiser each time an advertisement associated with the advertiser is presented to an online system user (i.e., an "impression" of the advertisement to an online system user). To identify impressions of advertisements included in a scrollable advertisement unit, the online system loads a tracking mechanism (e.g., a tracking pixel) associated with an advertisement included in a scrollable advertisement unit and presented in a display area of the scrollable advertisement unit and when one or more rules ("impression rules") applied to the advertisement in the display area of the scrollable advertisement unit are satisfied. When the tracking mechanism is loaded, an impression of the advertisement in the display area of the scrollable advertisement unit is identified.

As a user navigates through advertisements in the scrollable advertisement unit, the online system may apply different impression rules to determine when to credit an impression of advertisements in the scrollable advertisement unit. For example, an impression of an advertisement in a scrollable advertisement unit is identified when at least a threshold percentage of the advertisement is included in the display area of the scrollable advertisement unit (e.g., 100% or 90% of the advertisement is displayed) or when a user interacts with an advertisement (e.g., indicates a preference for the advertisement, accesses the advertisement) in the display area. Additional rules may prevent identifying an impression of an advertisement in the scrollable advertisement unit if a user navigates (e.g., scrolls) past the advertisement in the display area of the scrollable advertisement unit at a rate exceeding a threshold rate or performs other types of actions.

One or more scrollable advertisement units may be displayed in a newsfeed presented to an online system user that includes stories describing actions performed by other online system users. Various types of advertisements may be included in a scrollable advertisement unit, such as stories describing actions of online system users that an advertiser compensates the online system for presenting to the user (i.e., "sponsored stories"). In some embodiments, when a user interacts with an advertisement in the display area of the scrollable advertisement unit, the display area is modified to display an additional advertisement in the scrollable advertisement unit. Additionally, at least a subset of the advertisements in a scrollable advertisement unit may be replaced with additional advertisements for content related to an advertisement in the scrollable advertisement unit with which a user interacted to increase the likelihood of the user interacting with additional advertisements in the scrollable advertisement unit.

BRIEF DESCRIPTION OF THE DRAWINGS

FIG. 4 is an example of a scrollable advertisement unit, in accordance with an embodiment of the invention.

Figure 1:
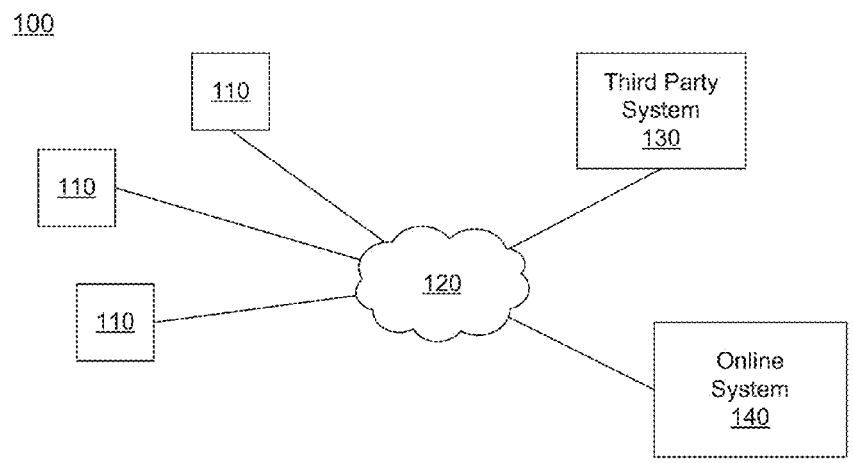
FIG. 1 is a block diagram of a system environment in which an online system operates, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

An online system presents a scrollable advertisement unit including multiple advertisements to a user. The scrollable advertisement unit includes a display area presenting one or more advertisements identified from multiple advertisements included in the scrollable advertisement unit. To identify impressions of advertisements in the scrollable advertisement unit, the online system applies one or more impression rules to the advertisements in the scrollable advertisement unit. If an advertisement included in the display area of the scrollable advertisement unit satisfies one or more impression rules, the online system loads a tracking mechanism associated with the advertisement in the display area. The advertisement associated with the loaded tracking mechanism is credited with an impression. Various impression rules may be applied by the online system to determine when to credit an advertisement with an impression. For example, a rule credits an advertisement with an impression when at least a threshold percentage of the advertisement is presented via the display area. As another example, a rule credits an advertisement with an impression when a user interacts with an advertisement in the display area. One or more impression rules may also be applied to determine when an impression is not credited to an advertisement. For example, an advertisement is not credited with an impression if the user navigates past the advertisement in the display area of the scrollable advertisement unit at a rate exceeding a threshold rate or performs any other suitable action indicating the user is unlikely to have viewed the advertisement.

A scrollable advertisement unit may perform actions to increase the likelihood of its included advertisements receiving impressions. For example, a scrollable advertisement unit may be presented to a user in a newsfeed including stories describing actions performed by other users of the online system connected to the user and include advertisements selected based on information associated with the user. As an example, the scrollable advertisement unit may include stories describing actions by other online system users connected to the user that an advertiser compensated the online system for presenting or may include advertisements selected based on information associated with the user by the online system. In some embodiments, a scrollable advertisement unit may present a different advertisement after a user views or interacts with an advertisement in the display area of the scrollable advertisement unit. Additionally, if a user interacts with an advertisement in the display area, at least a subset of the advertisements in the scrollable advertisement unit may be replaced with alternative advertisements for content related to the content of the advertisement with which the user interacted.

System Architecture

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. For example, the online system 140 is a social networking system. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130.

Figure 2:
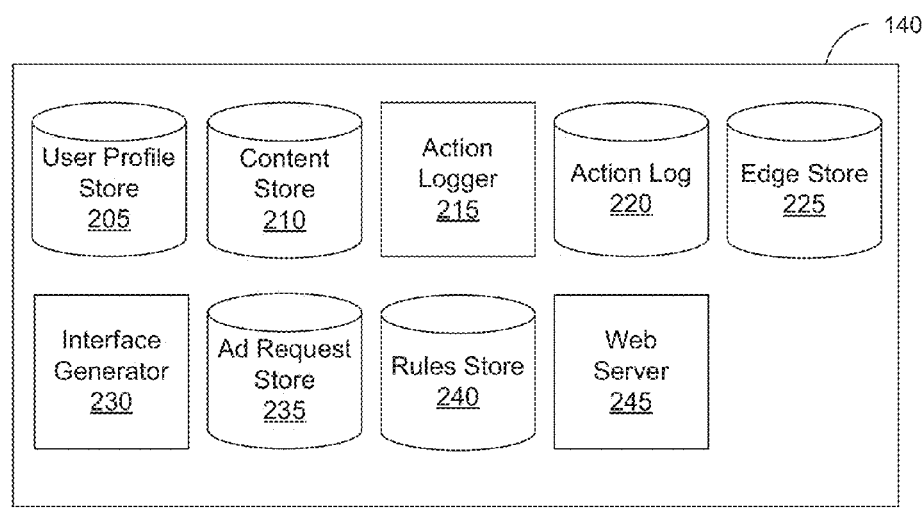
FIG. 2 is a block diagram of an online system, in accordance with an embodiment of the invention.

FIG. 2 is a block diagram of an architecture of the online system 140. The online system 140 shown in FIG. 2 includes a user profile store 205, a content store 210, an action logger 215, an action log 220, an edge store 225, an interface generator 230, an ad request store 235, a rules store 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, social networking system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The interface generator 230 generates one or more interfaces, such as web pages, including content from the online system 140. For example, interfaces generated by the interface generator 230 include images, video, profile information, or other data. The interface generator 230 also generates one or more interfaces allowing the online system 140 to request information from users and for users to provide information to the online system 140 via the client device 110 and the network 120. For example, the interface generator 230 generates a form for a user to provide biographic information, such as the user's age, for inclusion in the user's user profile. When other users request a user's profile page, the interface generator 230 retrieves data from the profile store 205 and generates a representation of the information in the user profile for presentation by the client device 110.

The interface generator 230 also generates a scrollable advertisement unit having a display area and including multiple advertisements. The scrollable advertisement unit presents one or more advertisements included in the scrollable advertisement unit to a user via the display area. Additionally, a user may interact with the scrollable advertisement unit to navigate among the advertisements in the scrollable advertisement unit to view different advertisements through the display unit. In one embodiment, a user may provide horizontal or vertical input to the display area of the scrollable advertisement unit to view different advertisements in the display area of the scrollable advertisement unit. For example, the scrollable advertisement unit presents a single advertisement in the display area and presents additional advertisements from the scrollable advertisement unit in the display area with when the user hovers over or clicks on a horizontal scroll tab, swipes a cursor from right to left, or provides another suitable input. Additionally, the interface generator 230 may replace at least a subset of the advertisements in a scrollable advertisement unit base on received user input. For example, at least a subset of advertisements in the scrollable advertisement unit are replaced with advertisements related to content in an advertisement with which a user has interacted. Replacing advertisements in a scrollable advertisement unit is further described below in conjunction with FIG. 4.

One or more advertisement requests ("ad requests") are stored in the ad request store 235. An advertisement request includes advertisement content and a bid amount. The advertisement content is text data, image data, audio data, video data, or any other data suitable for presentation to a user. In various embodiments, the advertisement content also includes a network address specifying a landing page to which a user is directed when the advertisement is accessed.

The bid amount is associated with an advertisement by an advertiser and specifies an amount of compensation the advertiser provides the online system 140 if the advertisement is presented to a user or accessed by a user. In one embodiment, the bid amount is used by the online system to determine an expected value, such as monetary compensation, received by the online system 140 for presenting the advertisement to a user, if the advertisement receives a user interaction, or based on any other suitable condition. For example, the bid amount specifies a monetary amount that the online system 140 receives from the advertiser if the advertisement is displayed and the expected value is determined based on the bid amount and a probability of a user accessing the displayed advertisement.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. The targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The online system 140 includes a rules store 240 storing information describing impression rules identifying when an impression is credited to an advertisement presented using a scrollable advertisement unit. In one embodiment, if one or more impression rules are satisfied by an advertisement, the online system 140 credits an impression to the advertisement. For example, if a rule for crediting an impression specifies that an advertisement be fully displayed to an online system user, an impression is not credited to the advertisement if a portion of the advertisement is outside of a display area. The rules store 240 may apply different impression rules to different types of advertisements. For example, a specific rule may be applied to advertisements including text but not applied to advertisements including only images. As another example, a rule applied to advertisements including text may specify that an advertisement be presented in a display area of a scrollable advertisement unit for at least a specified amount of time to credit an impression to the advertisement. Impression rules for crediting an impression to an advertisement in a scrollable advertisement unit are further described below in conjunction with FIG. 3.

The web server 245 links the online system 140 via the network 120 to the one or more client devices 110, as well as to the one or more third party systems 130. The web server 245 serves web pages, as well as other web-related content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that is stored in the content store 210. Additionally, the web server 245 may provide application programming interface (API) functionality to send data directly to native client device operating systems, such as IOS®, ANDROID™, WEBOS® or RIM®.

Crediting an Impression to an Advertisement in a Scrollable Advertisement Unit

When the online system 140 receives a request to present a scrollable advertisement unit to a user, it generates instructions for rendering a display including the scrollable advertisement unit. For example, the online system 140 generates instructions for rendering a web page including the scrollable advertisement unit that are communicated to a client device 110, which renders the display page for the display of a scrollable advertisement unit. The instructions identify one or more advertisement requests selected from the ad request store 235 for presentation via the scrollable advertisement unit. For example, the online system 140 selects candidate advertisement requests included in the ad request store 235 having at least one targeting criteria satisfied by a user to be presented with the display. From the candidate advertisement requests, specific advertisement requests are selected (e.g., through a bid-based auction) to be included in the scrollable advertisement unit and identified by the instructions.

Figure 3:
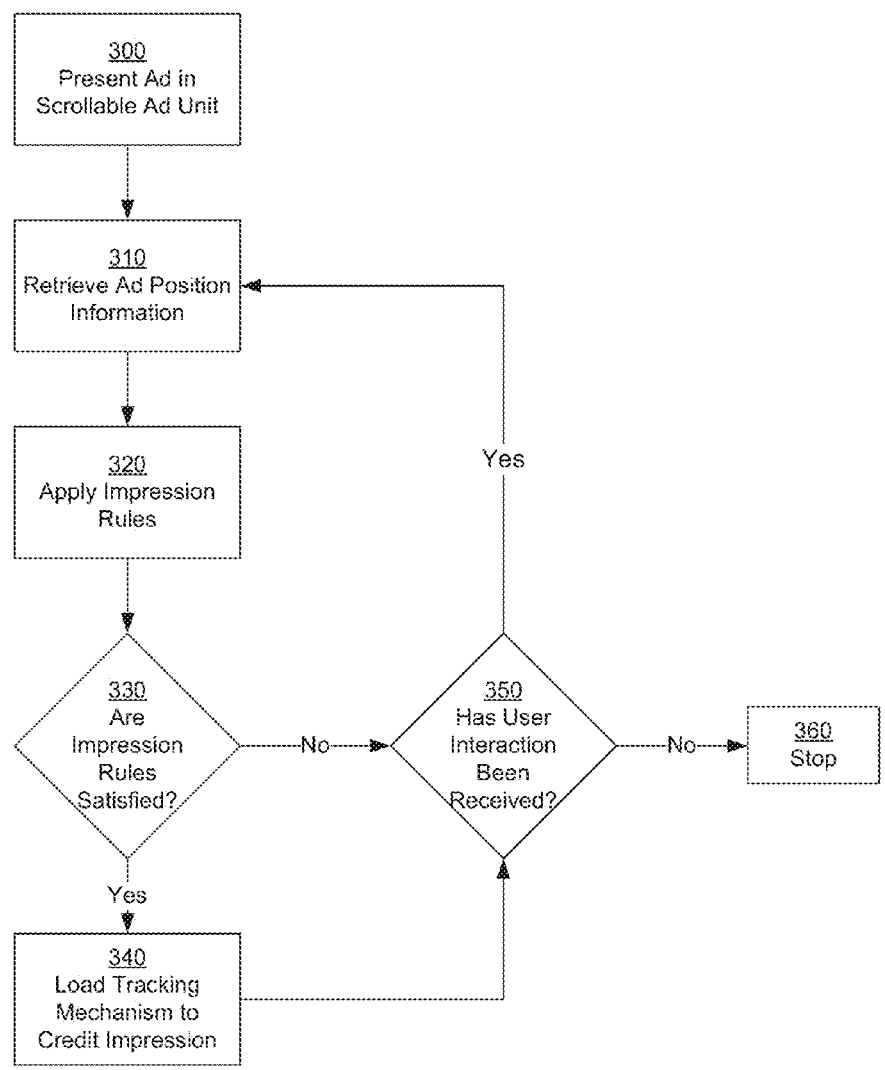
FIG. 3 is a flow chart of a method for determining an impression of an advertisement in a scrollable advertisement unit, in accordance with an embodiment of the invention.

FIG. 3 is a flow chart of one embodiment of a method for determining an impression of an advertisement in a scrollable advertisement unit. The online system 140 generates a scrollable advertisement unit 400, an example of which is shown in FIG. 4, in response to receiving a request from a client device 110 to present a scrollable advertisement unit to a user. One or more ad requests are identified based on information in the ad request store 240 and included in the scrollable advertisement unit 400. An advertisement 430a included in the scrollable advertisement unit 400 is presented 300 in a display area 420 of the scrollable advertisement unit 400 when the scrollable advertisement unit 400 is rendered by a client device 110. When the client device 110 presents 300 the scrollable advertisement unit 400, the online system 140 retrieves 310 information specifying the position of advertisements included in the scrollable advertisement unit 400 relative to the display area 420 from the client device 110 presenting 300 the scrollable advertisement unit. For example, the received information identifies the advertisement 430a included in the display area 420 and the position of additional advertisements 430b, 430c relative to the display area 420. The information may be retrieved 310 at a specified time (e.g., when a page is first rendered) or at time intervals.

The online system 140 retrieves one or more impression rules from the rules store 240 and applies 320 one or more of impression rules to the advertisement 430a presented in the display area 420 and the information about the position of advertisements in the scrollable advertisement unit 400 relative to the display area 420. In one embodiment, the information may identify a percentage of the advertisement 430a that is displayed in the display area 420. Examples of impression rules include: crediting an impression to the advertisement 430a in the display area 420 when an advertisement is fully included in the display area 420, crediting an impression to the advertisement 430a in the display area 420 when a threshold amount or percentage (e.g., 85% or 90%) of the advertisement 430a is within the display area 420, crediting an impression to the advertisement 430a in the display area 420 when a user clicks on the advertisement 430a, crediting an impression to the advertisement 430a in the display area 420 when a user indicates a preference for the advertisement 430a, and crediting an impression to the advertisement 430a in the display area 420 when a user navigates away (e.g., scrolls past) from the advertisement 430a displayed in the display area 420 at a rate not exceeding a specified rate.

The online system 140 determines 330 whether one or more of the retrieved impression rule are satisfied by the advertisement 430a. If at least one impression rules is satisfied, a tracking mechanism associated with the advertisement 430a is loaded 340. For example, a tracking pixel or other suitable information for determining that a user has viewed the advertisement 430a is loaded 340 to the advertisement 430a. Hence, loading 430 a tracking mechanism associated with the advertisement 430 indicates that a user has viewed the advertisement 430a and an impression is credited to the advertisement 430a. If at least one impression rule is not satisfied or if a tracking mechanism is loaded for the advertisement 430a, the online system 140 determines whether user interaction with the advertisement 430a has been received 350.

Examples of user interaction with the advertisement 430a includes: navigating (e.g., scrolling) through advertisements 430a, 430b, 430c, accessing the advertisement 430a, indicating a preference for (i.e., "liking") the advertisement 430a, RSVP to an event via the advertisement 430a, accepting offers for discounts offered by an advertiser via the advertisement 430a, etc. A user may scroll horizontally, vertically, or in both directions to view additional advertisements 430a, 430b included in the scrollable advertisement unit 400 in the display area 420 of the scrollable advertisement unit 400. A wrap-around feature may allow users to return to the advertisement 430a initially included in the display area 420 when a final advertisement in the scrollable advertisement unit 400 is included in the display area 420. Alternatively, users may navigate in an opposite direction when a final advertisement in the scrollable advertisement unit 400 is included in the display area 420 view earlier-presented advertisements in the display area 420. To modify the advertisement included in the scrollable advertisement unit presented by the display area 420, a user may interact with a scroll bar 410 in the display area 430, provide a gesture via the display area 420, move a cursor in the display area 420. If user interaction with the advertisement 430a has been received, position information about the advertisement 430a presented in the display area 420 and the positions of additional advertisements 430b, 430c relative to the display area 420 is retrieved 310 to evaluate whether to credit an impression to a different advertisement 430b, 430c presented in the display area 420 or whether to credit an impression to the advertisement 430a presented in the display area 420. If no user interaction has been received, no tracking mechanism is loaded for the advertisement 430a, and the process ends 360.

Enhancing Impressions of Advertisements in Scrollable Advertisement Units

A scrollable advertisement unit 400 may have one or more features for increasing the likelihood of advertisements 430 in the scrollable advertisement unit 400 being credited with impressions. For example, one or more scrollable advertisement units 400 displayed to a user of a social networking system user in a newsfeed describing actions of additional users, advertisements 430 in the scrollable advertisement units 400 may include stories describing actions of social networking system users that an advertiser compensates the social networking system for presenting stories describing actions of users connected to the user via the social networking system. Advertisements in a scrollable advertisement unit may also be selected based on information associated with the user by the online system (e.g., user profile information, actions performed by the user, connections between the user and objects or other users). In some embodiments, when a user interacts with an advertisement (e.g., 430a) one or more additional advertisements 430 are loaded which contain stories.

Additionally, when a user views or interacts with an advertisement 430a presented in the display area 420, the scrollable advertisement unit 400 may automatically present an additional advertisement 430b in the display area 420. For example, if a user accesses the advertisement 430a in the display area 420, the online system 140 determines that the user has viewed the advertisement 430a. Accordingly, the online system 140 loads a tracking mechanism associated with the advertisement 430a, credits an impression to the advertisement 430a, and presents an additional advertisement 430b from the scrollable advertisement unit 400 in the display area 420. Similarly, another advertisement 430c may be presented in the display area 420 if the additional advertisement 430b is credited with an impression. Further, at least a subset of the advertisements 430 in a scrollable advertisement unit 400 may be replaced with alternative advertisements for content related to an advertisement 430 in the scrollable advertisement unit 400 with which a user has interacted. For example, if a user indicates it likes an advertisement 430a for a page presented in the display area 420, the online system 140 may replace one or more advertisements 430 in the scrollable advertisement unit 400 with other advertisements related to the page, such as advertisements for posts on the page.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
sending, by an online system, for presentation in a display area of a display of a client device associated with a user of the online system, a scrollable advertisement unit, the scrollable advertisement unit including a plurality of advertisements, the display area occupying a portion of the display of the client device, an advertisement of the plurality of advertisements of the scrollable advertisement unit presented in the display area such that at least a portion of the advertisement is outside of the display area of the client device;
receiving, by the online system, from the client device, a user input;
sending, by the online system, an instruction to the client device to cause a greater portion of the advertisement to be presented within the display area, the instruction based on the user input;
retrieving, by the online system, information associated with a position of the advertisement in the display area;
applying, by the online system, one or more rules for crediting an advertisement impression to the advertisement in the display area, at least one of the rules crediting the advertisement impression responsive to at least a threshold portion of the advertisement being presented within the display area;
responsive to determining that one or more of the rules for crediting the advertisement impression are satisfied by the advertisement in the display area, loading, by the online system, a tracking pixel associated with the advertisement in the display area;
receiving, by the online system, from the client device, a message indicating that the client device has rendered the tracking pixel; and responsive to receiving the message, crediting, by the online system, the advertisement impression to the advertisement in the display area.

2. The method of claim 1, wherein the user input comprises a user interaction with the advertisement in the display area.

3. The method of claim 2, wherein the user interaction with the advertisement in the display area is selected from a group consisting of: scrolling one or more advertisements included in the scrollable advertisement unit horizontally through the display area, scrolling one or more advertisements included in the scrollable advertisement unit vertically through the display area, and any combination thereof.

4. The method of claim 2, wherein the user interaction with the advertisement in the display area comprises indicating a preference for the advertisement.

5. The method of claim 1, wherein the one or more rules for crediting the advertisement impression to the advertisement in the display area are selected from a group consisting of: crediting the impression if the advertisement is fully presented in the display area, crediting the impression if at least a threshold percentage of the advertisement is presented in the display area, crediting the impression if the user interacts with the advertisement in the display area, crediting the impression if the user navigates from the advertisement presented in the display area at a rate that does not exceed a threshold rate, and any combination thereof.

6. The method of claim 1, wherein the online system is a social networking system.

7. The method of claim 6, wherein the plurality of advertisements includes one or more stories associated with content maintained by the social networking system.

8. The method of claim 1, further comprising:
presenting an additional advertisement from the plurality of advertisements in the display area of the scrollable advertisement unit, the additional advertisement not associated with the tracking pixel.

9. The method of claim 1, further comprising replacing one or more of the plurality of advertisements included in the scrollable advertisement unit with one or more advertisements associated with content related to an advertisement with which the user has interacted.

10. A computer program product comprising a non-transitory computer-readable storage medium containing computer program code for:
receiving, from an online system, at a client device associated with a user of the online system, a scrollable advertisement unit, the scrollable advertisement unit including a plurality of advertisements;
presenting, by the client device, in a display area of a display of the client device, the scrollable advertisement unit, the display area occupying a portion of the display of the client device, an advertisement of the plurality of advertisements of the scrollable advertisement unit presented in the display area such that at least a portion of the advertisement is outside of the display area of the client device;
receiving, at the client device, a user input;
sending, by the client device, to the online system, the user input;
receiving, at the client device, from the online system, an instruction to cause a greater portion of the advertisement to be presented within the display area, the instruction based on the user input;
causing, by the client device, based on the received instruction, the advertisement to change position within the display area of the client device such that a greater portion of the advertisement is presented within the display area;
sending, by the client device, to the online system, information associated with a position of the advertisement in the display area;
responsive to one or more rules for crediting an advertisement impression being satisfied by the advertisement in the display area, at least one of the rules crediting the advertisement impression responsive to at least a threshold portion of the advertisement being presented within the display area:
receiving, at the client device, from the online system, a tracking pixel associated with the advertisement in the display area;
rendering, by the client device, the tracking pixel; and
sending, by the client device, to the online system, a message indicating that the client device has rendered the tracking pixel, the message causing the online system to credit the advertisement impression to the advertisement in the display area.

11. The method of claim 10, wherein the user input comprises a user interaction with the advertisement in the display area.

12. The method of claim 11, wherein the user interaction with the advertisement presented in the display area is selected from a group consisting of: scrolling the one or more advertisements included in the scrollable advertisement horizontally through the display area, scrolling the one or more advertisements included in the scrollable advertisement vertically through the display area, and any combination thereof.

13. The method of claim 11, wherein the user interaction with the advertisement is selected from a group consisting of: indicating a preference for the advertisement presented in the display area and accessing the advertisement presented in the display area.

14. The method of claim 10, wherein the one or more rules for crediting the advertisement impression to the advertisement in the display area are selected from a group consisting of: crediting the impression if the advertisement is fully presented in the display area, crediting the impression if at least a threshold percentage of the advertisement is presented in the display area, crediting the impression if the user interacts with the advertisement in the display area, crediting the impression if the user navigates from the advertisement presented in the display area at a rate that does not exceed a threshold rate, and any combination thereof.

15. The method of claim 10, wherein the online system is a social networking system.

16. The method of claim 15, wherein the plurality of advertisements includes one or more stories associated with content maintained by the social networking system.

17. The method of claim 10, further comprising:
presenting, by the client device, an additional advertisement from the plurality of advertisements in the display area of the scrollable advertisement unit, the additional advertisement not associated with the tracking pixel.

18. The method of claim 10, wherein the plurality of advertisements included in the scrollable advertisement unit comprise one or more advertisements associated with content related to an advertisement with which the user has interacted.

* * * * *